United States Patent Office 3,440,261
Patented Apr. 22, 1969

3,440,261
SILICONES CONTAINING AN AMIDO GROUP
AND METHOD OF PREPARING SAME
John C. Saam, Midland, Mich., assignor to Dow Corning
Corporation, Midland, Mich., a corporation of Michigan
No Drawing. Filed Mar. 18, 1965, Ser. No. 440,921
Int. Cl. C07f 7/02, 7/04; C08g 31/02
U.S. Cl. 260—448.2
24 Claims

ABSTRACT OF THE DISCLOSURE

Silanes and siloxanes containing an amido group in the side chain are disclosed as new compounds. In addition, the method of preparing these amido functional silicones by the alkaline hydrolysis of imidazoline functional silanes is also claimed. The compounds and copolymers are useful for treating glass cloth to improve the strength of laminates made therefrom, as textile treating agents to improve the dyeability of the textile, and as creaseproofing and water repellent agents for textiles.

This invention relates to silicones containing an amido group as a part of a substituent group on the silicon atom and to a method of preparing such silicones.

More specifically, this invention relates to compounds of the formula (1)
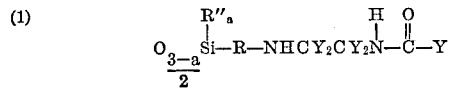

wherein

R is a divalent hydrocarbon radical free of aliphatic unsaturation,

Y is selected from the group consisting of the hydrogen atom and monovalent hydrocarbon radicals free of aliphatic unsaturation, R'' is a monovalent hydrocarbon radical, and $a$ has a value from 0 to 3, and their preparation by the hydrolysis, under alkaline conditions, of a silane of the formula (2)
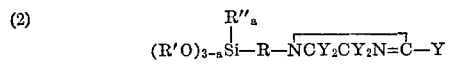

wherein R, Y, R'' and $a$ are as defined above and R' is an alkyl radical containing from 1 to 4 carbon atoms.

This invention further relates to copolymers containing siloxane units of the formula (A)
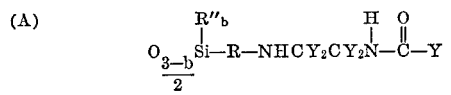

wherein R, Y and R'' are as defined above and $b$ has a value from 0–2, and siloxane units of the formula (B)

wherein R''' is selected from the group consisting of monovalent hydrocarbon radicals and substituted monovalent hydrocarbon radicals, and $c$ has a value from 0 to 3. The invention also relates to the preparation of such copolymers by the cohydrolysis and cocondensation, under alkaline conditions, of silanes of the formula (A')
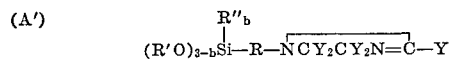

wherein R, Y, R'', R' and $b$ are as defined above, and a compound (B') selected from the group consisting of silanes of the formula R'''$_c$Si(OR')$_{4-c}$ and siloxanes containing non-acidic hydrolyzable groups and R''' radicals attached to the silicon atoms, R''' and $c$ being as defined above.

The products of this invention are useful, for example, as bonding agents for glass cloth and as textile treating agents to improve the dyeability of the textile (particularly with acid dyes).

In the above formulae R can be any saturated divalent hydrocarbon radical. Thus, R can be, for example, a
—CH$_2$—, —CH$_2$CH$_2$—, —(CH$_2$)$_3$—, —(CH$_2$)$_4$—,
—(CH$_2$)$_5$—
—(CH$_2$)$_{10}$—, —(CH$_2$)$_{18}$—, —(CH$_2$)$_{20}$—,
—CH$_2$CH(CH$_3$)CH$_2$—
—CH$_2$CH$_2$CH(CH$_3$)CH$_2$—, —CH$_2$CH$_2$CH(C$_2$H$_5$)CH$_2$—

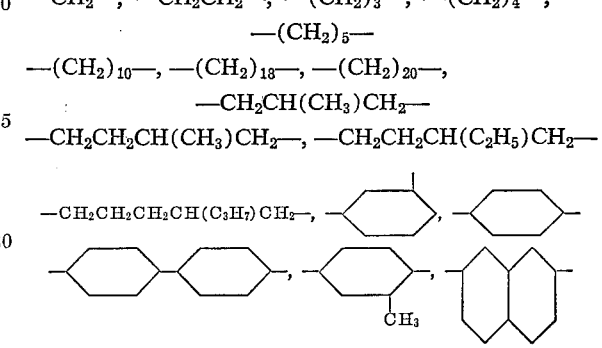

or a

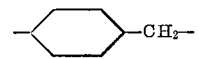

radical. Preferably R contains from 3 to 18 carbon atoms, with the radicals containing 3 or 4 carbon atoms being the most preferred.

The Y group in the above formula can either be a hydrogen atom or a monovalent hydrocarbon radical free of aliphatic unsaturation. Thus Y can be an alkyl radical such as a methyl, ethyl, propyl, butyl, amyl, octyl, decyl, dodecyl, octadecyl or a myricyl radical; a cycloalkyl radical such as a cyclopentyl or a cyclohexyl radical; an aryl radical such as a phenyl, xenyl or a naphthyl radical; an aralkyl radical such as a benzyl, 2-phenylethyl or a 2-phenylpropyl radical, or an alkaryl radical such as a tolyl, xylyl or a mesityl radical. It is generally preferred that the Y groups contain from 1 to 6 carbon atoms when they are a hydrocarbon radical, and most preferably the Y groups on the carbon atoms that bridge the two nitrogen atoms are hydrogen atoms.

R'' in the above formula can be any monovalent hydrocarbon radical. Suitable examples of such hydrocarbon radicals are set forth in the description of Y above. In addition to the above radicals, R'' can be, for example, an alkenyl radical such as a vinyl, allyl, hexenyl or an octadecenyl radical; an alkynyl radical such as a propynyl or an ethynyl radical; or a cycloalkenyl radical such as a cyclopentenyl or a cyclohexenyl radical.

In the silanes, R' is an alkyl radical containing from 1 to 4 carbon atoms. Thus R' can be a methyl, ethyl, propyl, isopropyl or a butyl radical.

The R''' radical can be any monovalent hydrocarbon radical or substituted monovalent hydrocarbon radical. By way of example, R''' can be an alkyl, alkenyl, alkynyl, cycloalkyl, cycloalkenyl, aryl, aralkyl or an alkaryl radical or the corresponding halogenated, cyano-substituted or aminated radical. Specific examples of some of these groups are given under the definitions of Y and R'' above. Specific examples of suitable groups not described under Y and R'' are the cyanoethyl, delta-cyanobutyl, omega-cyanooctadecyl, gamma-aminopropyl, delta-aminobutyl, omega-aminododecyl, H$_2$NCH$_2$CH$_2$NHCH$_2$CH$_2$CH$_2$—, H$_2$NCH$_2$CH$_2$NHCH$_2$CH(CH$_3$)CH$_2$—, aminophenyl, 3-chloropropyl, 4-bromobutyl, 3,3,3-trifluoropropyl, perfluorovinyl, chlorocyclohexyl, dichlorophenyl and the bromobenzyl radicals.

The siloxanes that can be used in preparing the copolymers of this invention are well known in the art. Generally speaking, the hydrolyzable groups are present as part of the endblocking groups but this is not an essential requirement. Even when this is the case, some such hydrolyzable groups will usually be found along the polymer chain. Examples of such hydrolyzable groups are the alkoxy groups (methoxy, ethoxy and isopropoxy), the acyloxy groups (acetoxy and propionoxy) and the cellosolvoxy groups (—CH$_2$CH$_2$OCH$_3$ and —CH$_2$CH$_2$OCH$_2$CH$_3$)

The term hydrolyzable group as used herein is also intended to include the hydroxyl group even though it is not "hydrolyzable" in the strictest definition of the term.

The compounds and copolymers of this invention are useful, for example, for treating glass cloth to improve the strength of laminates made therefrom. They are also useful as textile treating agents to improve the dyeability of the textile, particularly with acid dyes. These compounds and copolymers can also be reacted with amines such as melamine, triazine or substituted triazine to obtain creaseproofing and water repellent agents for textiles. Other uses of the products of this invention will be apparent to those skilled in the art.

The compounds of this invention are prepared by the hydrolysis of silanes of the Formula 2, given above, under alkaline conditions. Such silanes have been fully described, along with their method of preparation, in copending application Ser. No. 249,314, now U.S. Patent 3,373,137 of John C. Saam, filed Jan. 4, 1963 and entitled "Nitrogen-Containing Organosilicon Compounds and Their Preparation." The disclosure of this copending application is incorporated herein by reference.

By "alkaline condition," it is meant herein that the aqueous solution of the silane being hydrolyzed must have a pH greater than 7. However, it is generally preferred that a pH of at least 9 be employed in order to obtain a reasonable reaction rate. In some instances the silane being hydrolyzed will be basic enough to render the solution alkaline whereas in other instances it will be necessary to add enough of an alkaline material such as, sodium hydroxide, potassium hydroxide, calcium oxide, soium bicarbonate, potassium carbonate, guanidine, dimethylamine, methylamine, pyridine or ammonia, to make the solution alkaline. Of course, in some instances it will be desirable, as should be obvious to those skilled in the art, to add such an alkaline substance to the solution even if the silane per se is basic.

In order that those skilled in the art may better understand how the instant process can be carried out and how the new products can be made, the following examples are given by way of illustration and not by way of limitation.

Example 1

A mixture of 10 g. of

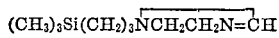
(CH$_3$)$_3$Si(CH$_2$)$_3$NCH$_2$CH$_2$N=CH and 10 g. of water was saturated with potassium carbonate. Two layers separated. The aqueous phase was extracted with ether and the extracts combined with the organic phase. The solution was dried over anhydrous calcium sulfate and then the solvent evaporated. A 93% yield, 10.7 g., of $$\text{(CH}_3\text{)}_3\text{Si(CH}_2\text{)}_3\text{NHCH}_2\text{CH}_2\overset{\text{H}}{\underset{|}{\text{N}}}-\overset{\text{O}}{\underset{\|}{\text{C}}}\text{H}\cdot\tfrac{1}{2}\text{H}_2\text{O}$$

was obtained. This compound was found to have a neutral equivalent of 211.8 (theoretical 211).

Example 2

55.6 g. of

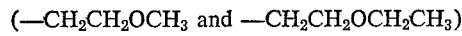
CH$_3$O(CH$_3$)$_2$SiCH$_2$CH(CH$_3$)CH$_2$NCH$_2$CH$_2$N=CH was mixed with 14.0 ml. of water. The reaction was exothermic. The excess was water removed in a vacuum of about 20 mm. of mercury at room temperature. The remaining water was then removed at 1.0 mm. of mercury pressure at room temperature over a period of 45 hours. The product, $$\text{O}_{1/2}\text{(CH}_3\text{)}_2\text{SiCH}_2\text{CH(CH}_3\text{)CH}_2\text{NHCH}_2\text{CH}_2\overset{\text{H}}{\underset{|}{\text{N}}}-\overset{\text{O}}{\underset{\|}{\text{C}}}\text{H}$$

had the following properties.

| | Found | Theoretical |
|---|---|---|
| Refractive index $n_D^{25}$ | 1.4875 | |
| Density $d^{25}$ | 1.013 | |
| Specific refraction $R_D$ | 0.284 | 0.285 |
| Neutral equivalent | 209 | 209 |
| Percent Si | 13.36 | 13.40 |

Example 3

Solutions of

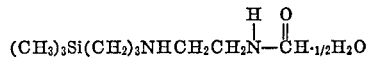
CH$_3$(CH$_3$O)$_2$SiCH$_2$CH(CH$_3$)CH$_2$NCH$_2$CH$_2$N=CH and

(CH$_3$O)$_3$Si(CH$_2$)$_3$NCH$_2$CH$_2$N=CH in isopropanol were prepared. These solutions were then added to water buffered on the alkaline side with disodium phosphate, the resulting mixtures vigorously shaken, and then allowed to stand at room temperature. The resulting products were $$\overset{\text{CH}_3}{\underset{|}{\text{O}\text{Si}}}\text{CH}_2\text{CH(CH}_3\text{)CH}_2\text{NHCH}_2\text{CH}_2\overset{\text{H}}{\underset{|}{\text{N}}}-\overset{\text{O}}{\underset{\|}{\text{C}}}\text{H}$$

and $$\text{O}_{3/2}\text{Si(CH}_2\text{)}_3\text{NHCH}_2\text{CH}_2\overset{\text{H}}{\underset{|}{\text{N}}}-\overset{\text{O}}{\underset{\|}{\text{C}}}\text{H}$$

respectively.

Example 4

When the silanes below are substituted in the process of Examples 1 or 2, the indicated products are obtained.

| Silane | Product |
|---|---|
| C$_2$H$_5$O(CH$_3$)$_2$SiCH$_2$CH(CH$_3$)CH$_2$NCH$_2$CH$_2$N=C-CH$_3$ 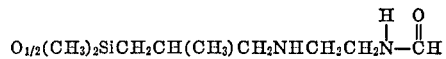 | O$_{1/2}$(CH$_3$)$_2$SiCH$_2$CH(CH$_3$)CH$_2$NHCH$_2$CH$_2$N(H)—C(=O)—CH$_3$ |
| (CH$_3$O)$_3$Si(CH$_2$)$_2$NCH(CH$_3$)CH$_2$N=C-CH$_3$ | O$_{3/2}$Si(CH$_2$)$_2$NHCH(CH$_3$)CH$_2$N(H)—C(=O)—CH$_3$ |
| CH$_3$(CH$_3$O)$_2$SiCH$_2$CH(C$_2$H$_5$)CH$_2$NCH$_2$CH$_2$N=C-C$_2$H$_5$ 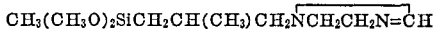 | (CH$_3$)OSiCH$_2$CH(C$_2$H$_5$)CH$_2$NHCH$_2$CH$_2$N(H)—C(=O)—C$_2$H$_5$ 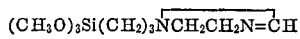 |
| (CH$_3$O)(CH$_3$)(C$_6$H$_{11}$)Si(CH$_2$)$_8$—NCH$_2$CH(C$_2$H$_5$)N=C—CH$_3$  | O$_{1/2}$(CH$_3$)(C$_6$H$_{11}$)Si(CH$_2$)$_8$NHCH$_2$CH(C$_2$H$_5$)N(H)—C(=O)—CH$_3$ |
| (CH$_3$O)$_2$C$_{10}$H$_7$Si(CH$_2$)$_3$NCH$_2$CH$_2$N=CH  | C$_{10}$H$_7$OSi(CH$_2$)$_3$NHCH$_2$CH$_2$N(H)—C(=O)—H |

| Silane | Product |
|---|---|
| [(CH₃)₂CHO]₂C₁₂H₂₅Si(CH₂)₁₈NCH₂CH₂N=CH | OSi(CH₂)₁₈NHCH₂CH₂N(H)—C(=O)—H, with C₁₂H₂₅ on Si |
| CH₃O(C₆H₅)₂SiC₆H₄NCH₂CH₂N=C—C₆H₅ | O₁/₂(C₆H₅)₂SiC₆H₄NHCH₂CH₂N(H)—C(=O)—C₆H₅ |
| (C₄H₉O)₃Si(CH₂)₄NCH(C₆H₁₁)CH₂N=CH | O₃/₂Si(CH₂)₄NHCH(C₆H₁₁)CH₂N(H)—C(=O)H |
| (CH₃O)₃SiCH₂NCH₂CH₂N=CH | O₃/₂SiCH₂NHCH₂CH₂N(H)—C(=O)H |
| (CH₃O)₂C₃H₇Si(CH₂)₃NCH₂CH₂N=C—C₁₂H₂₅ | OSi(CH₂)₃NHCH₂CH₂N(H)—C(=O)—C₁₂H₂₅, with C₃H₇ on Si |
| CH₃O(CH₃)(C₂H₅)SiC₆H₄CH₂NCH₂CH₂N=CH | O₁/₂(CH₃)(C₂H₅)SiC₆H₄CH₂NHCH₂CH₂N(H)—C(=O)H |
| (CH₃O)₃Si—⟨C₆H₁₀(CH₃)⟩—NCH₂CH₂N=CH | O₃/₂Si—⟨C₆H₁₀(CH₃)⟩—NHCH₂CH₂N(H)—C(=O)—H |

Example 5

A copolymer containing about 85 mol percent of (CH₃)₂SiO units and about 15 mol percent of O₁/₂(CH₃)₂SiCH₂CH(CH₃)CH₂NHCH₂CH₂N(H)—C(=O)H units can be prepared when a hydroxyl endblocked polydimethylsiloxane and the silane

are mixed under alkaline conditions.

Example 6

When the silanes below are cohydrolyzed and cocondensed under alkaline conditions such as those of Examples 1 or 2 above, copolymers containing the indicated siloxane units are obtained.

| | Silanes | Siloxane Units |
|---|---|---|
| I | (CH₃)C₂H₅Si(OCH₃)₂ | (CH₃)C₂H₅SiO |
| | HC=NCH₂CH₂N(CH₂)₃Si(OCH₃)₃ | HC(=O)—NCH₂CH₂NH(CH₂)₃SiO₃/₂ |
| II | CH₂=CH(CH₃)Si(OCH₃)₂ | CH₂=CH(CH₃)SiO |
| | (CH₃)₂Si(OCH₃)₂ | (CH₃)₂SiO |
| | HC=NCH₂CH₂N(CH₂)₃Si(CH₃)(OCH₃)₂ | HC(=O)—NCH₂CH₂NH(CH₂)₃Si(CH₃)O |
| III | CF₃CH₂CH₂(CH₃)Si(OC₂H₅)₂ | CF₃CH₂CH₂(CH₃)SiO |
| | C₆H₁₁Si(OC₂H₅)₃ | C₆H₁₁SiO₃/₂ |
| | HC=NCH₂CH₂NCH₂CH(CH₃)CH₂Si(OCH₃)₃ | HC(=O)—NCH₂CH₂NHCH₂CH(CH₃)CH₂SiO₃/₂ |
| IV | C₆H₅(CH₃)Si(OC₃H₇)₂ | C₆H₅(CH₃)SiO |
| | (CH₃)₃SiOCH₃ | (HC₃)₃SiO₁/₂ |
| | HC=NCH₂CH(CH₃)N(CH₂)₄Si(C₂H₅)(OCH₃)₂ | HC(=O)—NCH₂CH(CH₃)NH(CH₂)₄Si(C₂H₅)O |
| V | (CH₃)₃SiOCH₃ | (CH₃)₃SiO₁/₂ |
| | Si(OC₂H₅)₄ | SiO₂ |
| | CH₃C=NCH₂CH₂N(CH₂)₃Si(CH₃)₂(OCH₃) | CH₃C(=O)—NCH₂CH₂NH(CH₂)₃Si(CH₃)₂O₁/₂ |
| VI | NCCH₂CH₂CH₂(CH₃)Si(OC₂H₅)₂ | NCCH₂CH₂CH₂(CH₃)SiO |
| | (CH₃)₂Si(OC₂H₅)₂ | (CH₃)₂SiO |
| | HC=NCH₂CH₂N(CH₂)₅Si(OC₂H₅)₃ | HC(=O)—NCH₂CH₂NH(CH₂)₅SiO₃/₂ |
| VII | H₂NCH₂CH₂NH(CH₂)₃Si(OCH₃)₃ | H₂NCH₂CH₂NH(CH₂)₃SiO₃/₂ |
| | CH₃(C₁₂H₂₅)Si(OCH₃)₂ | CH₃(C₁₂H₂₅)SiO |
| | (CH₃)₂C₆H₄CH₂SiOCH₃ | (CH₃)₂C₆H₄CH₂SiO₁/₂ |
| | HC=NCH₂CH₂N(CH₂)₃Si(CH₃)(OCH₃)₂ | HC(=O)—NCH₂CH₂NH(CH₂)₃Si(CH₃)O |

| Silanes | Siloxane Units |
|---|---|
| VIII...... C₆H₃Cl₂Si(OCH₃)₃ | C₆H₃Cl₂SiO₃/₂ |
| (C₆H₅)₂Si(OH)₂ | (C₆H₅)₂SiO |
| (CH₃)₂Si(OCH₃)₂ | (CH₃)₂SiO |
| 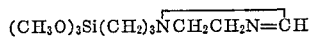 | 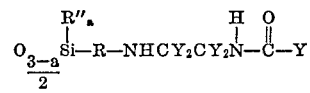 |
| IX........ H₂N(CH₂)₃Si(OC₂H₅)₃ | H₂N(CH₂)₃SiO₃/₂ |
| NCCH₂CH₂(CH₃)Si(OC₂H₅)₂ | NCCH₂CH₂(CH₃)SiO |
| 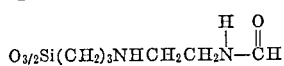 | 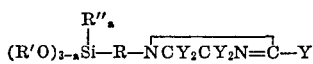 |

Example 7

One gram of

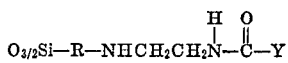

was diluted to 20 g. with 0.1% acetic acid whereupon a clear solution of

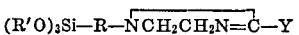

was formed. This solution was then further diluted to 200 g. with 0.1% acetic acid.

Heat cleaned 181-style glass cloth was dipped into the above solution, air dried for 45 minutes and then heated for 7 minutes at 110° C. The glass cloth (237.5 g.) was then dipped into a mixture of 213.5 g. of an acetone solution of DER 331 containing 60% resin solids or 128.1 g. resin and 18.55 g. of meta-phenylenediamine (14.5 parts per hundred parts resin). DER 331 is a low molecular weight liquid epoxy resin produced by the reaction of epichlorohydrin and bisphenol A. DER 331 has an epoxide equivalent weight of 187–193, a viscosity of 11,000–16,000 cps. and a specific gravity of 1.17. After dipping, the cloth was air dried about 15 minutes and then precured for another 15 minutes at 110° C. The cloth was then cut into 8″ squares and 14 of these squares stacked into a laminate by laying up the warp threads at 90° angles in alternate layers. This assembly was then press cured for 30 minutes at 150° C. under 30 pounds per square inch of pressure and then hot released. The resulting laminate was tested for flexural strength employing U.S. Federal Specification L-P 406b, Method 1031 and for compressive strength employing Method 1021 of the same specification. These properties were also measured on samples of the laminates after they had been boiled in water for two hours, then cooled to room temperature and wiped dry. The results of the latter test are referred to as "Two hour boil" in the table below. This test is recognized as being roughly the equivalent of standing in water at room temperature for one month. The two hour boil results times 100, and then divided by the as molded (dry) results is the percent retention of the strength.

For purposes of comparison, the above procedure was repeated with the exception that the glass cloth was not pretreated in any way prior to its being dipped in the epoxy resin.

Each of the flexural strength results reported below are an average obtained from four laminates tested and each of the compressive strength results are an average obtained from three laminates.

| Glass | Flexural Strength | | | Compressive Strength | | |
|---|---|---|---|---|---|---|
| | Dry | Two Hour Boil | Percent Retention | Dry | Two Hour Boil | Percent Retention |
| Treated | 63,525 | 58,950 | 92.8 | 27,183 | 24,550 | 90.3 |
| Untreated | 71,300 | 51,700 | 72.5 | 61,800 | 27,400 | 44.3 |

That which is claimed is:

1. A process for making compounds of the formula (1)

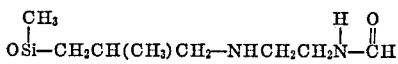

wherein
R is a divalent hydrocarbon radical,
Y is selected from the group consisting of the hydrogen atom and monovalent hydrocarbon radicals free of aliphatic unsaturation containing from 1 to 6 carbon atoms,
R″ is a monovalent hydrocarbon radical containing no more than 30 aliphatic carbon atoms and no more than 12 aromatic carbon atoms, and
a has a value from 0 to 3,
said process comprising hydrolyzing, under alkaline conditions, a silane of the formula (2)

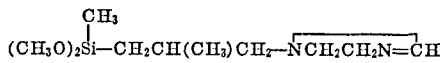

wherein R, Y, R″ and a are as defined above, and R′ is an alkyl radical containing from 1 to 4 carbon atoms.

2. The process of claim 1 wherein (1) is

O₃/₂Si—R—NHCH₂CH₂N—C—Y and (2) is (R′O)₃Si—R—NCH₂CH₂N=C—Y

3. The process of claim 2 wherein R′ is CH₃—, R is —CH₂CH₂CH₂— and Y is a hydrogen atom.

4. The process of claim 1 wherein (1) is

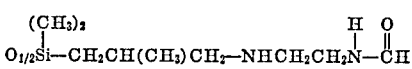

and (2) is

CH₃
|
(CH₃O)₂Si—CH₂CH(CH₃)CH₂—NCH₂CH₂N=CH

5. The process of claim 1 wherein (1) is

and (2) is (CH₃)₂
|
CH₃OSi—CH₂CH(CH₃)CH₂—NCH₂CH₂N=CH

6. The process of claim 1 wherein (1) is

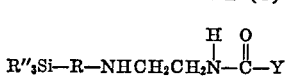

and (2) is

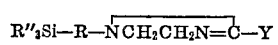

7. The process of claim 6 wherein R″ is CH₃—, R is —CH₂CH₂CH₂— and Y is a hydrogen atom.

8. A compound having the formula

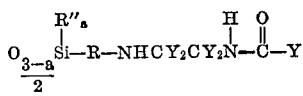

wherein
R is a divalent hydrocarbon radical,
Y is selected from the group consisting of the hydrogen atom and monovalent hydrocarbon radicals free of aliphatic unsaturation containing from 1 to 6 carbon atoms,
R'' is a monovalent hydrocarbon radical containing no more than 30 aliphatic carbon atoms and no more than 12 aromatic carbon atoms, and
$a$ has a value from 0 to 3.

9. A compound as defined in claim 8 having the formula

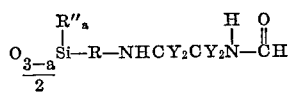

10. A siloxane of the unit formula

11. A siloxane of the unit formula

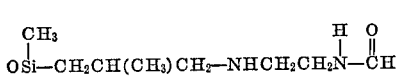

12. A siloxane of the unit formula

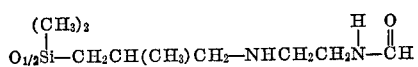

13. The silane

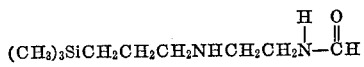

14. A process for making copolymers containing siloxane units of the formula (A) 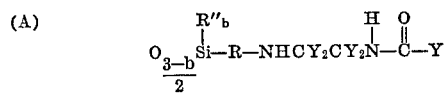

wherein
R is a divalent hydrocarbon radical,
Y is selected from the group consisting of the hydrogen atom and monovalent hydrocarbon radicals free of aliphatic unsaturation containing from 1 to 6 carbon atoms,
R'' is a monovalent hydrocarbon radical containing no more than 30 aliphatic carbon atoms and no more than 12 aromatic carbon atoms, and
$b$ has a value from 0–2, and siloxane units of the formula (B) 

wherein
R''' is selected from the group consisting of monovalent hydrocarbon radicals and substituted monovalent hydrocarbon radicals, there being no more than 30 aliphatic carbon atoms and no more than 12 aromatic carbon atoms in R''', and
$c$ has a value from 0 to 3,
said process comprising cohydrolyzing and cocondensing under alkaline conditions, silanes of the formula (A') 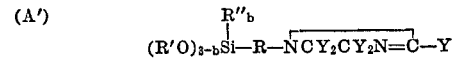

wherein
R, Y, R'' and $b$ are as defined above and R' is an alkyl radical containing from 1 to 4 carbon atoms, and a compound
(B') selected from the group consisting of silanes of the formula R'''$_c$Si(OR')$_{4-c}$, wherein R', R''' and $c$ are as defined above, and siloxanes containing non-acidic hydrolyzable groups and R''' radicals attached to the silicon atoms.

15. The process of claim 14 wherein (A) is

(A') is

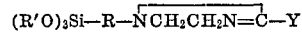

and in (B) and (B') R''' is selected from the group consisting of the methyl, phenyl and 3,3,3-trifluoropropyl radicals.

16. The process of claim 15 wherein R is

Y is a hydrogen atom and $c$ is about 2.

17. The process of claim 15 wherein R is

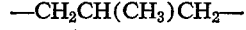

Y is a hydrogen atom and $c$ is about 2.

18. A copolymer containing siloxane units of the formula (A) 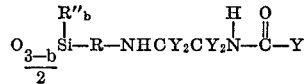

wherein
R is a divalent hydrocarbon radical,
Y is selected from the group consisting of the hydrogen atom and monovalent hydrocarbon radicals free of aliphatic unsaturation containing from 1 to 6 carbon atoms,
R'' is a monovalent hydrocarbon radical containing no more than 30 aliphatic carbon atoms and no more than 12 aromatic carbon atoms, and
$b$ has a value from 0–2, and siloxane units of the formula (B) 

wherein
R''' is selected from the group consisting of monovalent hydrocarbon radicals and substituted monovalent hydrocarbon radicals, there being no more than 30 aliphatic carbon atoms and no more than 12 aromatic carbon atoms in R''', and
$c$ has a value from 0 to 3.

19. The copolymer of claim 18 wherein (A) is

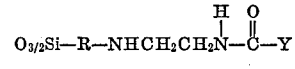

and in (B), R''' is selected from the group consisting of the methyl, phenyl and 3,3,3-trifluoropropyl radicals.

20. The copolymer of claim 19 wherein (A) is

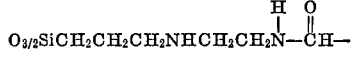

and in (B), $c$ is about 2.

21. The copolymer of claim 19 wherein (A) is

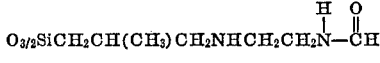

and in (B), $c$ is about 2.

22. The copolymer of claim 18 wherein (A) is

and in (B), R''' is selected from the group consisting of the methyl, phenyl and 3,3,3-trifluoropropyl radicals.

23. The copolymer of claim 22 wherein (A) is

and in (B), $c$ is about 2.

24. The copolymer of claim 22 wherein (A) is

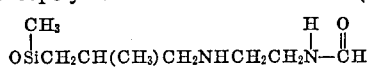

and in (B), $c$ is about 2.

References Cited

UNITED STATES PATENTS

| | | | |
|---|---|---|---|
| 2,919,173 | 12/1959 | Roff | 8—8 XR |
| 2,971,864 | 2/1961 | Speier | 117—124 XR |
| 2,929,829 | 3/1960 | Morehouse | 260—448.2 |
| 3,088,847 | 5/1963 | Pines | 117—75 XR |
| 3,174,987 | 3/1965 | Simmler et al. | 260—448.2 |

TOBIAS E. LEVOW, *Primary Examiner.*

J. P. PODGORSKI, *Assistant Examiner.*

U.S. Cl. X.R.

260—448.8, 46.5; 117—124, 139.4; 106—13